United States Patent
Kim et al.

(10) Patent No.: US 8,771,145 B2
(45) Date of Patent: Jul. 8, 2014

(54) METHOD OF CONTROLLING DOUBLE CLUTCH TRANSMISSION OF VEHICLE

(75) Inventors: Joung Chul Kim, Suwon-si (KR); Ju Hyun Nam, Bucheon-si (KR); Hee Yong Lee, Suwon-si (KR); Byeong Wook Jeon, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 13/303,892

(22) Filed: Nov. 23, 2011

(65) Prior Publication Data

US 2012/0312109 A1 Dec. 13, 2012

(30) Foreign Application Priority Data

Jun. 9, 2011 (KR) ........................ 10-2011-0055634

(51) Int. Cl.
*B60W 10/02* (2006.01)
(52) U.S. Cl.
USPC .............................................. 477/115; 477/80
(58) Field of Classification Search
USPC ................................................. 477/80, 175
See application file for complete search history.

(56) References Cited

U.S. PATENT DOCUMENTS

| | | | |
|---|---|---|---|
| 5,172,602 A | 12/1992 | Jürgens et al. | |
| 5,863,276 A * | 1/1999 | Lee ................................ | 477/144 |
| 5,915,512 A | 6/1999 | Adamis et al. | |
| 6,009,768 A * | 1/2000 | Hoshiya et al. ............. | 74/336 R |
| 6,679,134 B2 | 1/2004 | Shigyo | |
| 6,826,974 B2 | 12/2004 | Kobayashi | |
| 6,832,978 B2 * | 12/2004 | Buchanan et al. ............. | 477/174 |
| 6,887,184 B2 * | 5/2005 | Buchanan et al. ............. | 477/174 |
| 8,256,312 B2 * | 9/2012 | Hatori et al. .................... | 74/330 |
| 2004/0166992 A1 | 8/2004 | Buchanan et al. | |
| 2005/0288149 A1 | 12/2005 | Kuhstrebe et al. | |
| 2010/0184561 A1 | 7/2010 | Schaarschmidt et al. | |
| 2011/0306464 A1 | 12/2011 | Holland et al. | |
| 2012/0312109 A1 | 12/2012 | Kim et al. | |
| 2012/0312110 A1 | 12/2012 | Kim et al. | |
| 2012/0312652 A1 | 12/2012 | Kim et al. | |

FOREIGN PATENT DOCUMENTS

| | | |
|---|---|---|
| EP | 1 450 075 A2 | 8/2004 |
| FR | 2 837 256 A1 | 3/2003 |
| JP | 2-11646 U | 1/1990 |
| JP | 2002-122157 A | 4/2002 |
| JP | 2008-82526 A | 4/2008 |
| JP | 2011-2007 A | 1/2011 |
| KR | 10-0316912 B1 | 12/2001 |
| KR | 10-2006-0134423 A | 12/2006 |
| KR | 10-2008-0029137 A | 4/2008 |
| WO | WO 2004/028850 A1 | 4/2004 |

\* cited by examiner

*Primary Examiner* — Edwin A Young

(74) *Attorney, Agent, or Firm* — Morgan, Lewis & Bockius LLP

(57) ABSTRACT

A method of controlling a double clutch transmission of a vehicle to conduct a series of downshifting operations from a preceding gear to a subsequent gear via a current gear in response to deceleration of the vehicle, may include maintaining a clutch which has been in an engaged state at the preceding gear, in the engaged state until after an order to shift to the subsequent gear may be generated, when shifting from the preceding gear to the current gear, releasing the clutch after the order to shift to the subsequent gear may be generated, and engaging a shift gear of the subsequent gear after the releasing of the clutch.

5 Claims, 3 Drawing Sheets

METHOD OF CONTROLLING DOUBLE CLUTCH TRANSMISSION OF VEHICLE

CROSS-REFERENCE TO RELATED APPLICATIONS

The present application claims priority to Korean Patent Application No. 10-2011-0055634 filed on Jun. 9, 2011, the entire contents of which is incorporated herein for purposes by this reference.

BACKGROUND OF THE INVENTION

1. Field of the Invention

The present invention relates generally to a method of controlling a double clutch transmission (DCT) of a vehicle and, more particularly, to a technique for preventing shift shock from occurring when shifting gears in response to deceleration of a vehicle provided with a DCT.

2. Description of the Related Art

A downshifting process of a DCT when a vehicle provided with the DCT decelerates, for example, to stop, will be described below with reference to FIG. 1.

When the vehicle decelerates, a transmission controller generates an order to shift gears from a preceding gear N+1 to a current gear N set as a target gear. Thereafter, the transmission controller releases a clutch which has been in an engaged state at a preceding gear N+1, and then releases a clutch of a corresponding input shaft, before releasing the preceding gear N+1 so that the corresponding input shaft enters a freely rotating state.

Subsequently, when shifting to a subsequent gear N−1, the clutch of the input shaft is temporarily engaged to make the rpm of the input shaft which higher than that of the output shaft before the shift gear of the subsequent gear N−1 is engaged. Thereafter, a shift gear of the subsequent gear N−1 is engaged. Thereby, shift shock can be prevented from occurring.

In other words, if the rpm of the input shaft is less than that of the output shaft when engaging the shift gear of the subsequent gear N−1, backlash of elements pertaining to transmission of power between the input shaft and the output shaft, which has been arranged in one direction when synchronization takes place for engagement of the shift gear of the subsequent gear N−1, is rearranged in the reverse direction when the synchronization is completed or the transmission of power from the input shaft to the output shaft begins. At this time, shift shock and noise occur. To avoid such a phenomenon, as stated above, the technique of FIG. 1 is configured such that the clutch is temporarily engaged before the gear engagement of the subsequent gear N−1.

However, while gears are shifted from the preceding gear N+1 to the subsequent gear N−1, a series of frequent movements of the clutch in which it is released, engaged and released again, may cause another kind of abnormal shock and noise. Moreover, the frequent movement of the clutch is responsible for the durability of the clutch and an actuator of the clutch deteriorating.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE INVENTION

Accordingly, the present invention has been made keeping in mind the above problems occurring in the prior art, and an object of the present invention is to provide a method of controlling a double clutch transmission of a vehicle which can prevent abnormal shock and noise from occurring due to frequent movement of a clutch when downshifting from a preceding gear to a subsequent gear via a current gear in response to deceleration of a vehicle provided with a DCT, and which can prevent shock and noise from occurring due to conversion of backlash arrangement of elements pertaining to power transmission between an input shaft and an output shaft, thus improving the quality of shifting performance, thereby enhancing the quietness and riding comfort of the vehicle, and increasing the marketability of the vehicle, and enhancing the durability of the clutch and an actuator of the clutch.

In an aspect of the present invention, a method of controlling a double clutch transmission of a vehicle to conduct a series of downshifting operations from a preceding gear to a subsequent gear via a current gear in response to deceleration of the vehicle, may include maintaining a clutch which may have been in an engaged state at the preceding gear, in the engaged state until after an order to shift to the subsequent gear may be generated, when shifting from the preceding gear to the current gear, releasing the clutch after the order to shift to the subsequent gear may be generated, and engaging a shift gear of the subsequent gear after the releasing of the clutch.

The method may further include releasing a shift gear of the preceding gear during the maintaining of the clutch.

In another aspect of the present invention, a method of controlling a double clutch transmission of a vehicle to conduct a series of downshifting operations from a preceding gear to a subsequent gear via a current gear in response to deceleration of the vehicle, may include releasing the preceding gear that may include releasing a shift gear of the preceding gear while a clutch, which controls transmission of power to an input shaft connected to the shift gear of the preceding gear, may be in an engaged state, and shifting gears to the subsequent gear that may include releasing the clutch which may have been in the engaged state, from the preceding gear, and engaging a shift gear of the subsequent gear.

When shifting the current gear between the preceding gear and the subsequent gear, the clutch which may have been in the engaged state at the preceding gear may be continuously maintained in the engaged state.

In further another aspect of the present invention, a method of controlling a double clutch transmission of a vehicle to conduct a series of downshifting operations from a preceding gear to a subsequent gear via a current gear in response to deceleration of the vehicle, wherein a clutch connected to an input shaft pertaining both to the preceding gear and the subsequent gear may be controlled such that a power transmission state may be continuously maintained just before a shift gear of the subsequent gear may be engaged via the current gear.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
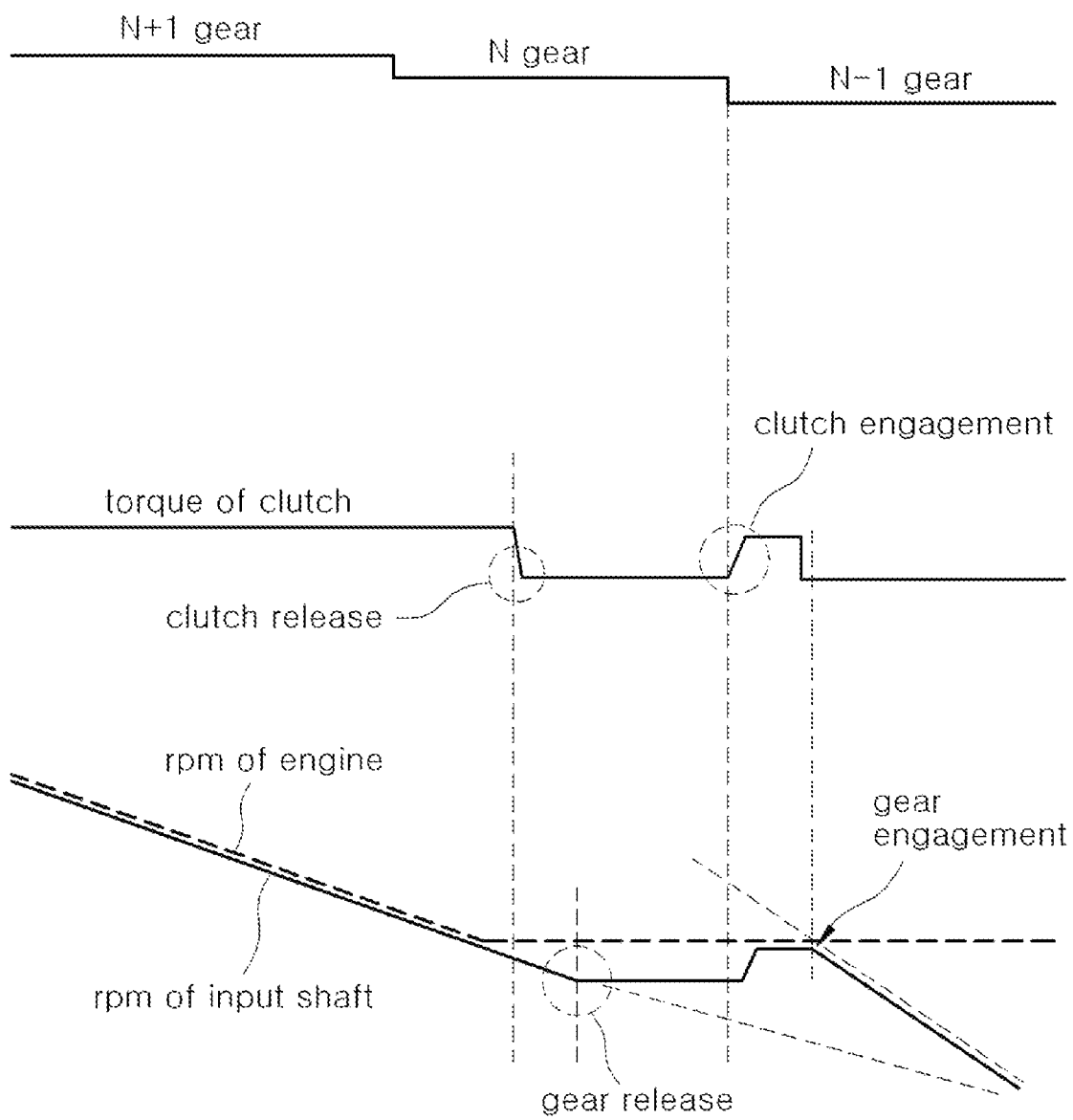
FIG. 1 is a graph illustrating a method of controlling a double clutch transmission of a vehicle, according to a conventional technique.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF THE PREFERRED EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the attached drawings.

Figure 2:
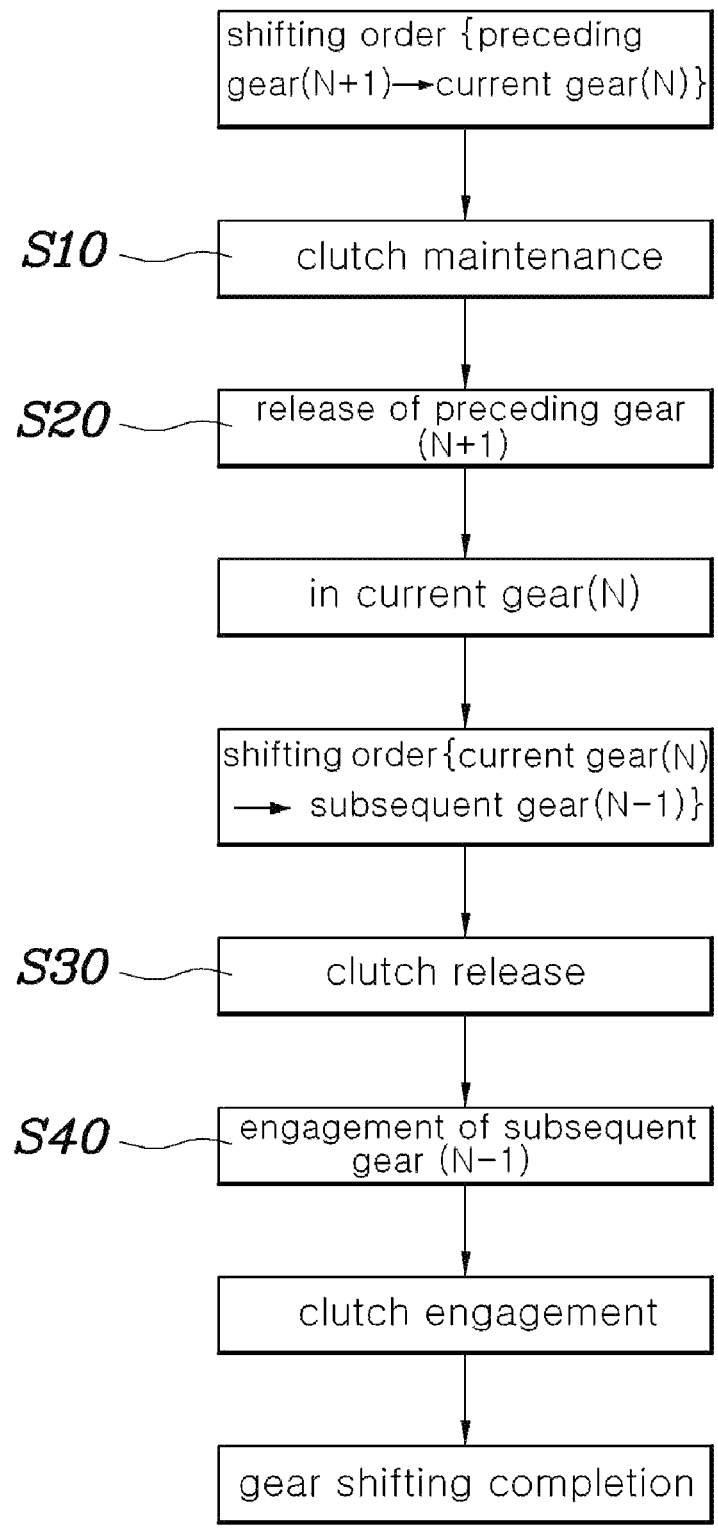
FIG. 2 is a flowchart of a method of controlling a double clutch transmission of a vehicle, according to an exemplary embodiment of the present invention.
Figure 3:
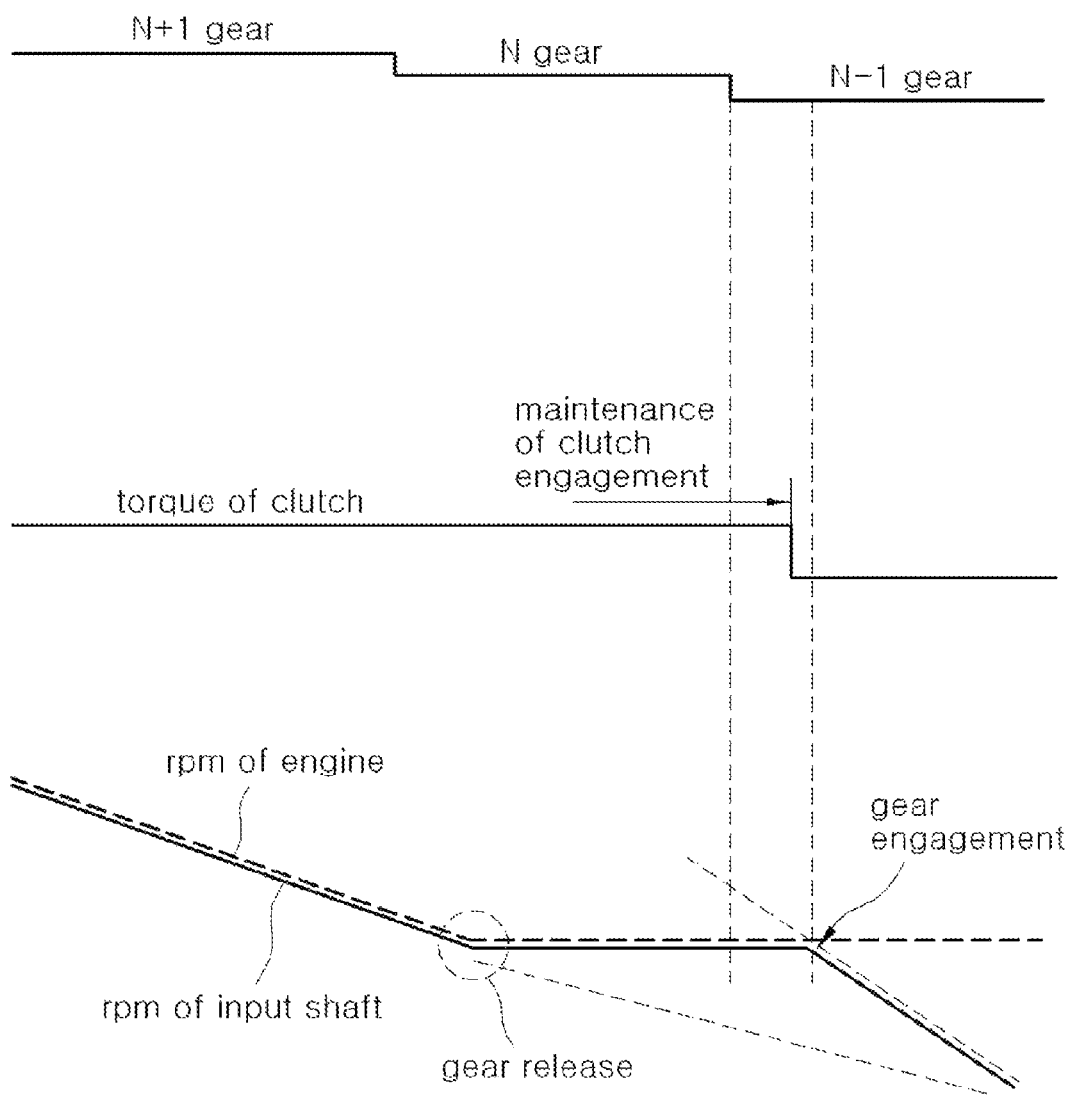
FIG. 3 is a graph illustrating the method of controlling the double clutch transmission according to an exemplary embodiment of the present invention.

Referring to FIGS. 2 and 3, the present invention provides a method of controlling a double clutch transmission of a vehicle according to an exemplary embodiment of the present invention when a series of downshifting operations from a preceding gear N+1 to a subsequent gear N−1 via a current gear N is conducted in response to deceleration of the vehicle. The method of the present invention includes a clutch maintaining step S10, a clutch release step S30 and a gear engagement step S40. At the clutch maintaining step S10, when gears are shifted from the preceding gear N+1 to the current gear N, a clutch which has been in an engaged state at the preceding gear N+1 is continuously maintained until after an order is given to shift to the subsequent gear N−1. At the clutch release step S30, the clutch is released after the order to shift to the subsequent gear has been given. At the gear engagement step S40, a shift gear of the subsequent gear N−1 engages after the clutch release step S30.

Furthermore, when gears are shifted from the preceding gear N+1 to the current gear N, to release the preceding gear N+1, a gear release step S20 of releasing a shift gear of the preceding gear N+1 is conducted during the clutch maintaining step S10.

In other words, unlike the conventional technique, when a series of downshifting operations from the preceding gear N+1 to the subsequent gear N−1 via the current gear N is gone through, the clutch which has been in the engaged state at the preceding gear N+1 is maintained without being released until just before shifting to the subsequent gear N−1. Thereafter, the clutch is released just before engaging the shift gear of the subsequent gear N−1 to shift to the subsequent gear N−1. Hence, the clutch can be prevented from frequently moving, and shift shock can be prevented or minimized from occurring due to variation in arrangement of backlash when shifting to the subsequent gear N−1.

For reference, in this embodiment, the preceding gear N+1 and the subsequent gear are assigned to the same input shaft, and the current gear N is assigned to another input shaft. Further, the clutch mentioned in this embodiment means a clutch which is configured such that power is transmitted to the input shaft that pertains to the preceding gear N+1 and the subsequent gear N−1.

In the process of shifting the gears from the preceding gear N+1 to the subsequent gear N−1, releasing the preceding gear N+1 includes releasing the shift gear of the preceding gear N+1 while the clutch, which controls transmission of power to the input shaft connected to the shift gear of the preceding gear N+1, is in the engaged state.

Furthermore, shifting the gears to the subsequent gear N−1 includes releasing the clutch which was in the engaged state from the preceding gear N+1, and engaging the shift gear of the subsequent gear N−1. Of course, when in the current gear N between the preceding gear N+1 and the subsequent gear N−1, the clutch which has been in the engaged state at the preceding gear N+1 is continuously maintained in the engaged state.

Meanwhile, while the clutch which has been in the engaged state at the preceding gear N+1 is continuously maintained in the engaged state, torque transmitted by the clutch may be lower than that of when power is transmitted by a corresponding shift gear.

In other words, because the preceding gear N+1 is in the released state and the subsequent gear N−1 is not yet in the engaged state, only torque appropriate to rotate the input shaft which is in a freely rotating state is required.

As mentioned above, if the clutch connected to the input shaft which is assigned both to the preceding gear N+1 and to the subsequent gear is controlled such that the power transmission state is maintained until just before the shift gear of the subsequent gear N−1 is engaged via the current gear N, when the shift gear of the subsequent gear N−1 is engaged to shift to the subsequent gear N−1, the rpm of the input shaft is higher than that of the output shaft. This structure can prevent or markedly reduce shift shock and noise occurring when backlash of elements between the input shaft and the output shaft which pertain to the power transmission is rearranged in the reversed direction.

That is, the input shaft separates from the clutch just before the shift gear of the subsequent gear engages. At this time, the vehicle is decelerating. Therefore, the rpm of the input when synchronization for engagement of the shift gear of the subsequent gear is higher than at least the rpm of the output shaft. Thus, backlash between elements, such as the shift gears, the clutch gear, a sleeve, a hub, etc., which pertain to transmission of power from the input shaft to the output shaft via the shift gear of the subsequent gear, is arranged in the direction in which the input shaft operates the output shaft. Such a backlash arrangement state is maintained even after gear shifting has completed and the clutch enters the engaged state to transmit power from the input shaft to the output shaft. Hence, unlike the conventional technique, shift shock or noise can be prevented from occurring due to the conversion of backlash arrangement in the reverse direction.

Moreover, because vibrations, noise or shock attributable to the conversion of backlash arrangement is prevented from occurring, and because the movement of the clutch when it is released or engaged is greatly reduced compared to that of the conventional technique, noise and vibrations resulting from the movement of the clutch are markedly reduced, and the durability of not only elements pertaining to the operation of the clutch but also the clutch itself can be enhanced.

As described above, the present invention prevents abnormal shock and noise resulting from frequent movement of a clutch when downshifting from a preceding gear to a subsequent gear via a current gear i response to deceleration of a vehicle provided with a DCT. In addition, the present invention can prevent shock and noise from occurring due to conversion of backlash arrangement of elements pertaining to power transmission between an input shaft and an output shaft. Thereby, the quality of shifting performance is improved, thus enhancing the quietness and riding comfort of the vehicle, and increasing the marketability of the vehicle. Moreover, the durability of the clutch and an actuator of the clutch can be enhanced.

The foregoing descriptions of specific exemplary embodiments of the present invention have been presented for purposes of illustration and description. They are not intended to be exhaustive or to limit the invention to the precise folios disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a double clutch transmission of a vehicle to conduct a series of downshifting operations from a preceding gear to a subsequent gear via a current gear in response to deceleration of the vehicle, the method comprising:
   engaging a clutch at the preceding gear;
   maintaining the clutch in an engaged state with the preceding gear at a constant torque level until after an order to shift to the subsequent gear is generated, when shifting from the preceding gear to the subsequent gear via the current gear;
   releasing the clutch after the order to shift to the subsequent gear is generated; and
   engaging a shift gear of the subsequent gear after the releasing of the clutch.

2. The method as set forth in claim 1, further comprising:
   releasing a shift gear of the preceding gear during the maintaining of the clutch.

3. A method of controlling a double clutch transmission of a vehicle to conduct a series of downshifting operations from a preceding gear to a subsequent gear via a current gear in response to deceleration of the vehicle, the method comprising:
   engaging a clutch at the preceding gear, wherein the clutch controls transmission of power to an input shaft connected to the shift gear of the preceding gear;
   releasing the preceding gear by releasing a shift gear of the preceding gear while the clutch, is in an engaged state with a constant torque level from before the downshifting from the preceding gear to current gear, and
   shifting gears to the subsequent gear by releasing the clutch from the engaged state from the preceding gear, and engaging a shift gear of the subsequent gear.

4. The method as set forth in claim 3, wherein when shifting the current gear between the preceding gear and the subsequent gear, the clutch which has been in the engaged state at the preceding gear is continuously maintained in the engaged state.

5. A method of controlling a double clutch transmission of a vehicle to conduct a series of downshifting operations from a preceding gear to a subsequent gear via a current gear in response to deceleration of the vehicle, the method comprising:
   controlling a clutch connected to an input shaft pertaining both to the preceding gear and the subsequent gear such that the clutch is continuously maintained in an engaged state with a constant torque level just before a shift gear of the subsequent gear is engaged via the current gear.

\* \* \* \* \*